WORK LOCATOR

Filed May 17, 1962 10 Sheets-Sheet 1

INVENTORS
MARTIN FRIEDLAND
FREDERICK W. SCHNEIDER
BY
ATTORNEYS

INVENTORS
MARTIN FRIEDLAND
FREDERICK W. SCHNEIDER
BY
ATTORNEYS

March 23, 1965 M. FRIEDLAND ETAL 3,174,747
WORK LOCATOR
Filed May 17, 1962 10 Sheets-Sheet 3

INVENTORS
MARTIN FRIEDLAND
FREDERICK W. SCHNEIDER
BY
ATTORNEYS

INVENTORS
MARTIN FRIEDLAND
FREDERICK W. SCHNEIDER
BY
ATTORNEYS

INVENTORS
MARTIN FRIEDLAND
FREDERICK W. SCHNEIDER
BY
ATTORNEYS

March 23, 1965

M. FRIEDLAND ETAL 3,174,747

WORK LOCATOR

Filed May 17, 1962

10 Sheets-Sheet 6

INVENTORS
MARTIN FRIEDLAND
BY FREDERICK W. SCHNEIDER
ATTORNEYS

March 23, 1965 M. FRIEDLAND ETAL 3,174,747

WORK LOCATOR

Filed May 17, 1962 10 Sheets-Sheet 7

INVENTORS
Martin Friedland
Frederick W. Schneider
BY
ATTORNEYS

INVENTORS
Martin Friedland
Frederick W. Schneider
ATTORNEYS

INVENTORS
Martin Friedland
Frederick W. Schneider
BY
ATTORNEY

WORK LOCATOR

Filed May 17, 1962 10 Sheets-Sheet 10

INVENTORS
Martin Friedland
Frederick W. Schneider
BY
ATTORNEY 3,174,747
Patented Mar. 23, 1965

3,174,747

WORK LOCATOR

Martin Friedland, Flourtown, and Frederick W. Schneider, Levittown, Pa., assignors, by mesne assignments, to The Warner & Swasey Company, Cleveland, Ohio, a corporation of Ohio Filed May 17, 1962, Ser. No. 196,566
6 Claims. (Cl. 269—315)

The present application is a continuation-in-part of our copending application Serial No. 833,315, filed August 12, 1959, for Workholder, now Patent No. 3,076,644, issued February 5, 1963.

The present invention relates to workholders for machine tools and more particularly to the work locator on a workholder.

A purpose of the invention is to automatically retract and advance a work locator in a workholder.

A further purpose is to retract and retain retracted a work locator from its reference position within a workholder when the workholder withdraws from an interference position.

A further purpose is to automatically advance a work locator into a reference position on a workholder before a reload of the workholder.

A further purpose is to advance a plurality of work locators into their respective reference position simultaneously under a single control.

A further purpose of the invention is to advance a workholder by a thruster and to close the jaws of the workholder by forward motion of the thruster with the work locator selectively advanced or retracted.

A further purpose is to automatically release and retract one of several workholders holding a work piece when danger of interference arises, and advance the workholder when the danger of interference subsides, with the work locator in a retracted position.

Further purposes appear in the specification and in the claims.

In the drawings we have chosen to illustrate only one of the numerous embodiments in which the invention appears, selecting the form shown from the standpoints of convenience in illustration, satisfactory operation and clear demonstration of the principles involved.

FIGURE 13 is an enlarged section on the line 13—13 of FIGURE 1.

FIGURE 14 is a partial elevational view of the workholder of the invention showing the improvement in the work locator.

FIGURE 15 is a top plan view of the workholder and locator of FIGURE 14.

FIGURE 16 is a partial elevation showing the workholder extended and the work locator advanced.

FIGURE 17 is a partial plan view of the workholder and locator in the position of FIGURE 16.

FIGURE 18 is a partial elevation showing the workholder retracted and the work locator in a retracted position.

FIGURE 19 is a partial elevation showing the workholder of the invention extended and the locator retracted within the workholder.

FIGURE 20 is a partial elevation showing the workholder retracted and the trip arm in a vertical position.

FIGURE 21 is a partial elevation showing the workholder advancing with the work locator in a forward position.

Figure 1:
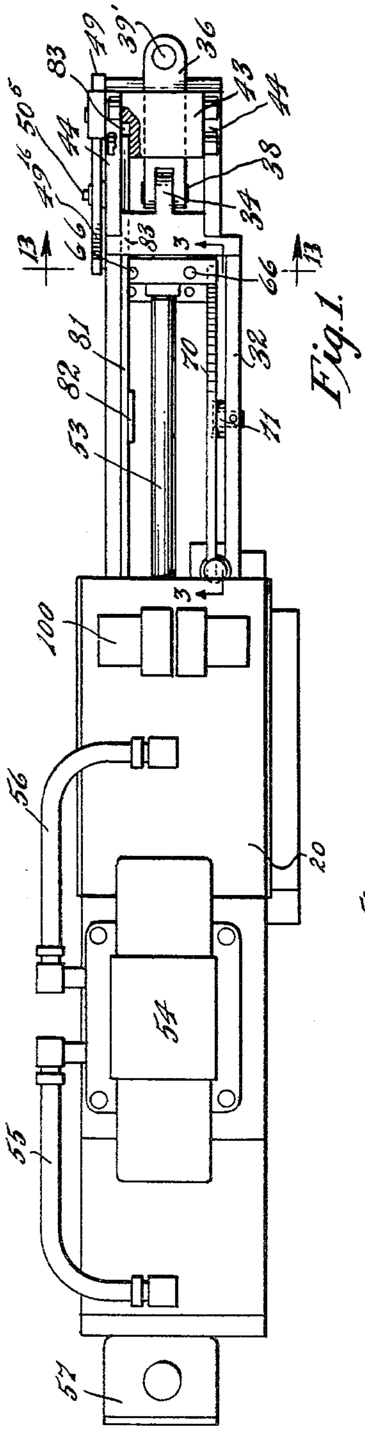
FIGURE 1 is a top plan view of one of the workholders of the present invention.

Describing in illustration but not in limitation, and referring to the drawings:

In the prior art, workholders have generally been manually attached devices which engage the work and support it. With increase in the size and the speed of operation of machine tools, especially turret punch press gauging tables, there is an increasing need for workholders which can operate to engage and release and advance and retract work by remote control.

Furthermore in such devices where there are a plurality of workholders, it may be necessary to carry the work to a position in which an individual workholder would interfere with the machine tool or be damaged.

Our previously referred to copending application provides workholders capable of engaging and releasing and advancing and retracting at high speed and capable of withdrawing from participation when danger of interference occurs. The present invention is more specifically concerned with automatically retracting a work locator and holding the work locator retracted until the workholder is ready for reloading at which time the work locator is advanced to a reference position.

As described in our copending application a plurality of workholders are used on an individual work piece. The work piece is initially gripped by the jaws after being located by a work locator, the location and function of which will be subsequently described. This locator is in a forwardmost position with respect to the workholder when the work piece is initially being loaded, and forms the abutment against which the work piece rests prior to gripping by the jaws.

It has been found that when a workholder retracts to avoid a zone of interference, and then advances to regrip the work piece, the locator in a forwardmost or reference position with respect to the workholder, has a tendency to bump the work piece. This bumping causes misalignment of the work piece. To avoid this condition, the present invention automatically retracts the locator when the workholder retracts to avoid a danger zone, and then automatically, under the control of the operator, advances the locator to its referene position when a new piece is to be loaded.

The work locator improvement of the invention is very simple in construction and convenient in operation, performing its retracting and extending operation automatically.

In the workholder of the copending application, a sliding guide 20, suitably of box formation, is supported on shim pads 21 resting on a laterally movable carriage 23. Socket head cap screws 22 extend through the carriage 23 and are threaded into tapped holes 22′ in the sliding guide 20 to secure the sliding guide 20 to the laterally movable carriage 23. The sliding guide 20 is levelled on the carriage 23 by shims 21.

A dowel $22^2$ passes through holes $22^3$ and $22^4$ and positions the sliding guide 20 relative to the laterally movable carriage 23.

Figure 6:
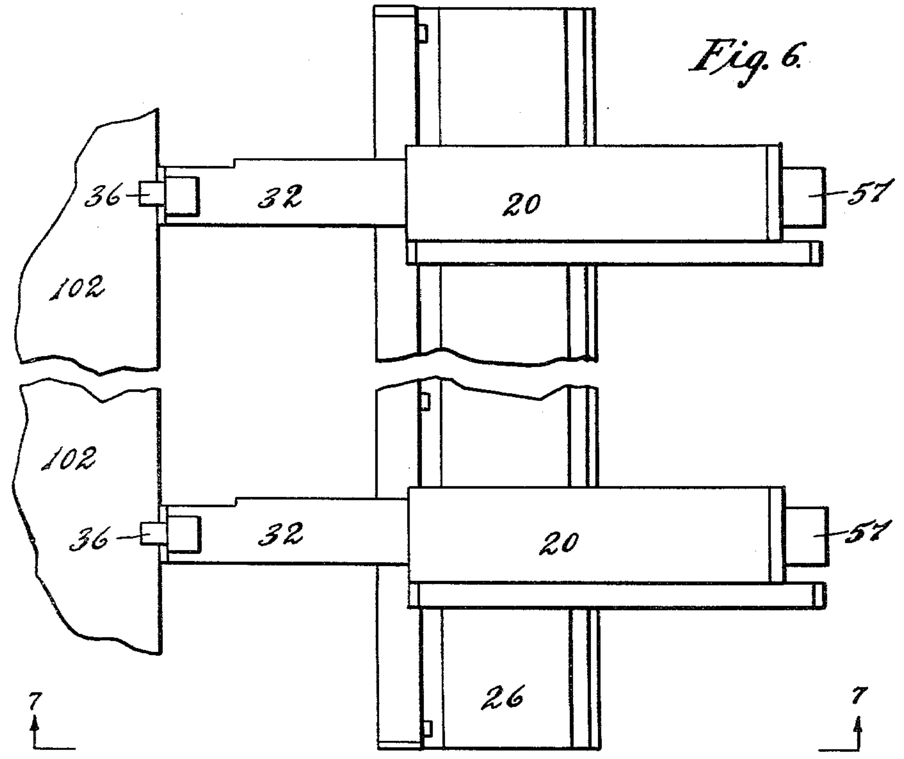
FIGURE 6 is a diagrammatic fragmentary top plan view of a machine tool according to the invention, showing two of several workholders.

The carriage 23 has guide surfaces 25 which slide transversely of the machine tool on ways 26 which extend the full width of the machine tool and are supported on a frame 27 on the gauging table and moving with it. It will be understood that there will suitably be a plurality of different workholders on the same ways, only two being shown in FIGURE 6.

Figure 5:
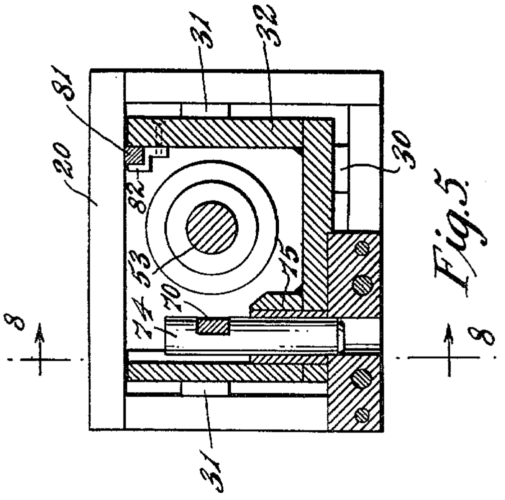
FIGURE 5 is an enlarged section on the line 5—5 of FIGURE 2.
Figure 4:
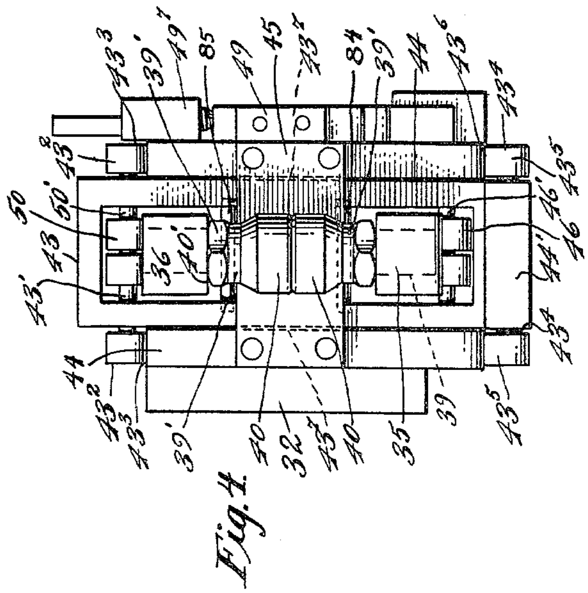
FIGURE 4 is an enlarged front end elevation of the workholder of the invention taken on the line 4—4 of FIGURE 2.

The sliding guide is desirably provided on the inside with longitudinal guiding surfaces or ways 30 at the bottom and 31 at the sides as best seen in FIGURE 5.

Inside the sliding guide 20 and guiding on the ways is placed a forwardly and backwardly moving carriage 32, generally of channel formation and capable of telescoping inside the sliding guide and moving forward beyond it.

The carriage 32 at the forward end has fixed thereon lower and upper bearing lugs 33 and 34, and on the bearing lugs are pivoted lower workholder jaw 35 and upper workholder jaw 36 on pins 37 and 38 extending through openings in the lugs and the jaws.

Threaded studs 39 and nuts 39′ swivelly connect toggle pads 40 to the jaws at 40′.

The lower jaw 35 has a first approach cam surface 41 and a second holding cam surface 42 on its lower edge, while the upper jaw 36 has a first approach cam surface 47 and a second holding cam surface 48 on its upper edge.

A suitably rectangular cam housing or collar 43 is movable back and forth in the space between spaced sides 44 secured at the front of the carriage. Collar 43 carries roller pins 43′ journalling cam rollers $43^2$ which ride on cam surfaces $43^3$ on the top of sides 44. Pins $43^4$ carry cam rollers $43^5$ which ride on cam surface $43^6$ which is on the bottom of sides 44. Wear strips, not shown, extending in the direction of motion of the carriage, are suitably secured to the sides of the cam collar 43 and bear against spaced sides 44 at $43^7$. The cam collar 43 is limited to sideward motion by the sides 44 and is limited in forward motion by the stroke of the hydraulic cylinder 51. A tie plate 45 extends across the front of the carriage and is suitably secured to sides 44 behind the gripping portions of the jaws, thus supporting the sides 44 together. Within this range the cam collar 43 is permitted to move forward and its lower cam rollers 46 journalled on pins 46′ engage successively cam surfaces 41 and 42 on the lower surface of the lower jaw. The upper jaw has first and second cam surfaces 47 and 48 on the top surface which are successively engaged by cam rollers 50 journalled on pins 50′ on the upper portion of the cam collar.

Figures 2, 3:
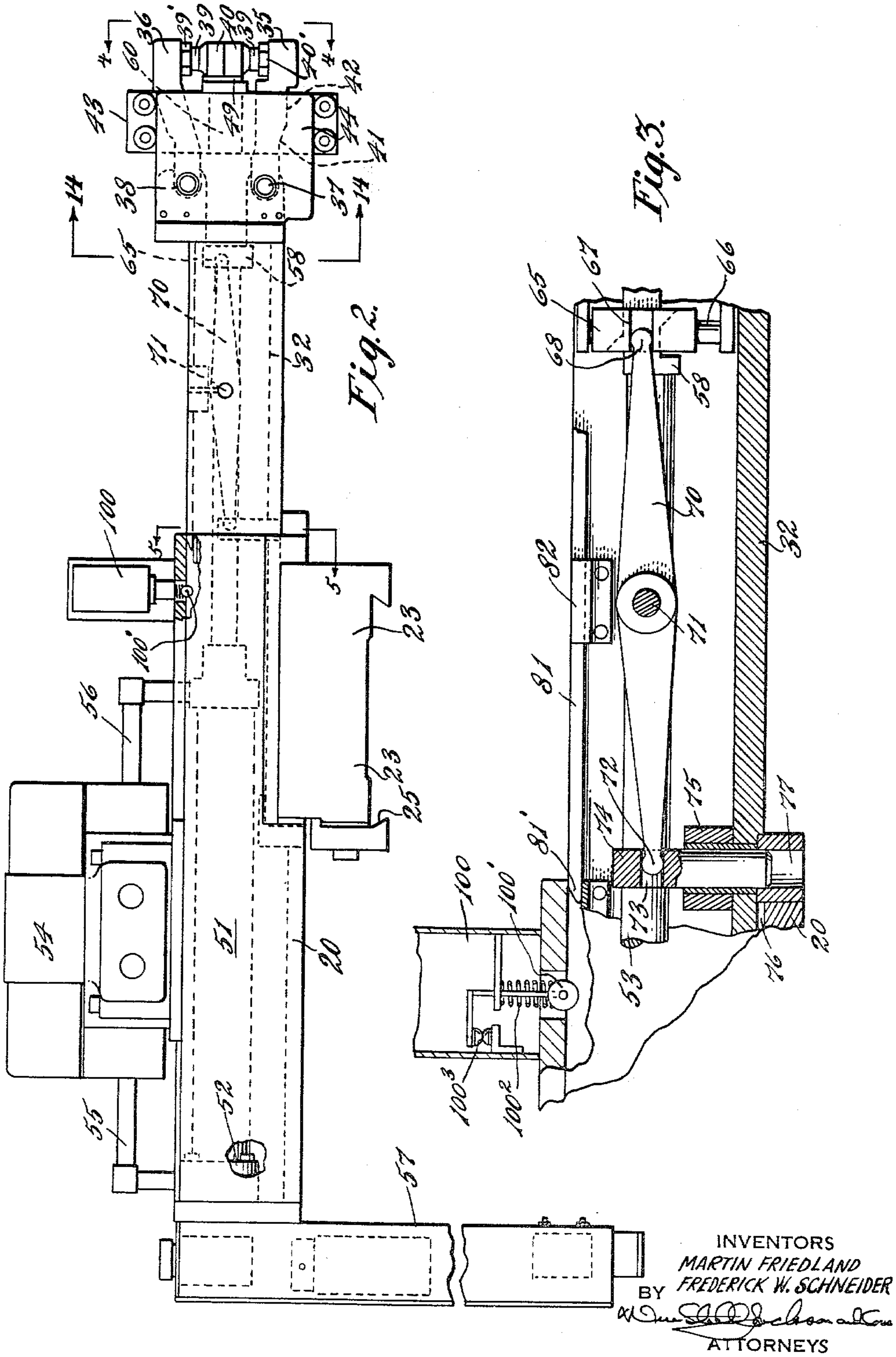
FIGURE 2 is a fragmentary side elevation of the workholder of FIGURE 1.
FIGURE 3 is a fragmentary enlarged section on the line 3—3 of FIGURE 1.

A thruster, suitably a double acting hydraulic cylinder 51, is mounted at 52 at the back of the sliding guide 20, and has a piston and rod combination 53 which extends forward in the carriage. The thruster is operated by a solenoid operated hydraulic control valve 54 carrying a built in control valve which supplies hydraulic fluid selectively to opposite ends of the cylinder through pipes 55 and 56. The pump and valve assembly is conveniently located on top of the sliding guide as best seen in FIGURES 1 and 2.

At the rear of the sliding guide the housing 57 is extended down and holds suitable control equipment, as later explained.

At the forward end, the piston rod of the thruster connects with a longitudinal cam 58 which at the forward end is secured to a cross piece 60 in the cam collar 43. Thus it will be seen that the cam collar 43 will be moved forward and rearward by the movement of the thruster 51. The cross piece 60 is located between the jaws 35 and 36 and the cam 58 extends through an opening between the lugs 33 and 34 located in the front of the carriage.

Cam 58 has a forward straight track 61 on both sides which corresponds to locking of the cam collar, an intermediate slope 62 on both sides and a rearward straight track 63 on both sides which corresponds to unlocking the cam collar. The cam 58 also has a stop abutment 64 at its rearward end.

The cam 58 passes through an opening in and is surrounded by a cam follower 65 having suitable approach surfaces to permit it to ride the slope of 62 and otherwise follow one of the other cam surfaces 61 or 63. The cam follower 65 is retained in position against moving longitudinally with respect to the carriage by transverse guide pins 66 shown in FIGURES 1, 3 and 14, and has a notch 67 at one side which receives one ball end 68 of a toggle lever 70 pivoted on pin 71 intermediate its ends in the side wall of the carriage 32.

The rear end of the toggle lever 70 has a ball end 72 which engages in a notch 73 of a laterally movable locking pin 74.

The locking pin is guided by a tubular bearing 75 in the carriage and rides a track 76 in the sliding guide over a portion of the travel of the carriage. When the carriage reaches a forward position, locking pin 74 engages in hole 77 in support guide 20 (FIGURE 3).

Figure 9:
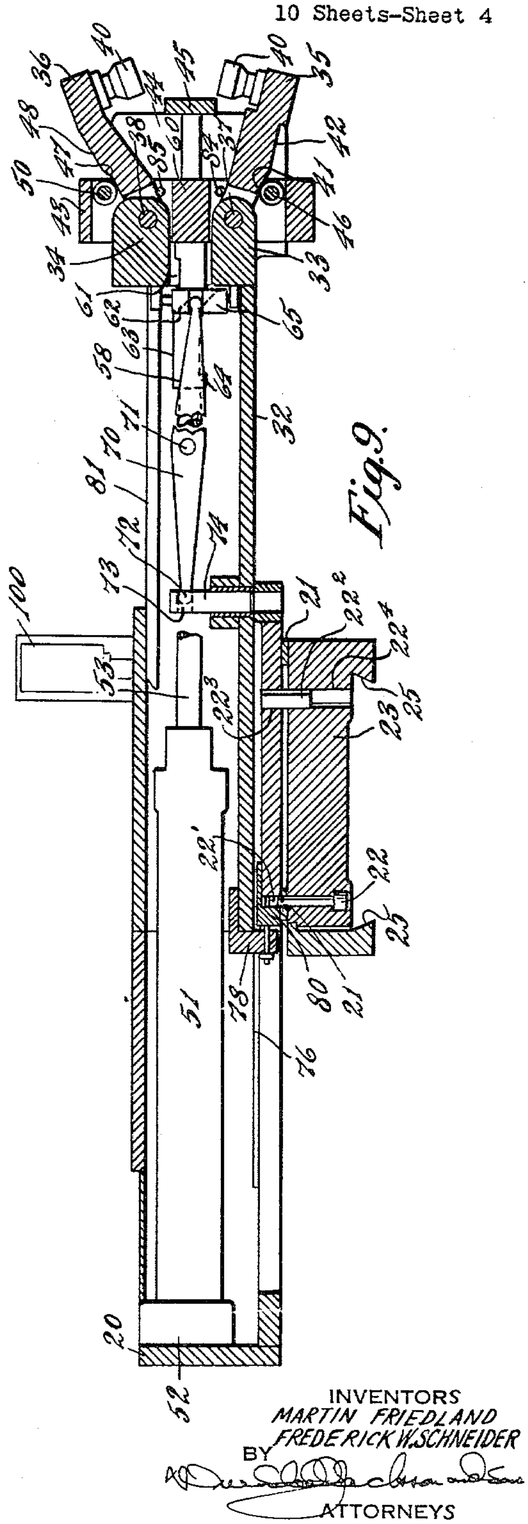
FIGURES 9 to 11 are views showing other positions of the workholder of FIGURE 8.

When the carriage moves forward to its limiting position, adjustable stop 78 on the back of the carriage engages bumper 80 on the sliding guide as shown in FIGURE 9. A trip mechanism 81 extends along the carriage 32 guided on guides 82 and extends into a slot 83 in the sliding collar. The trip mechanism 81 is fixed to and slides with carriage 32. The end of trip mechanism 81′ is bevelled to engage roller 100′ of limit switch 100. Roller 100′ is spring biased by helical spring $100^2$. Contact is made at $100^3$ when trip mechanism 81 slides away from roller 100′, and contact is broken when trip mechanism 81 engages roller 100′ and forces it upward.

The cam collar 43 has pins 84 and 85 which engage the insides of the gripping jaws. When the collar is retracted the pin 85 holds the upper jaw up, and the pin 84 forces the lower jaw down.

Figure 7:
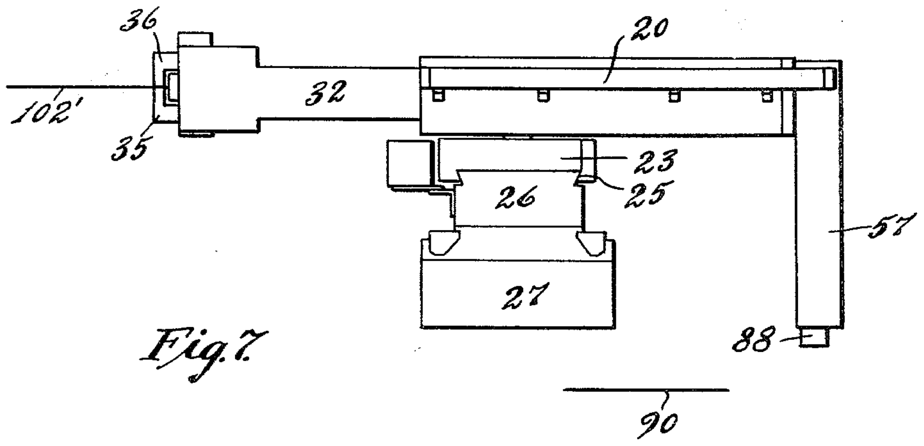
FIGURE 7 is an end elevation of FIGURE 6 taken on the line 7—7.
Figure 12:
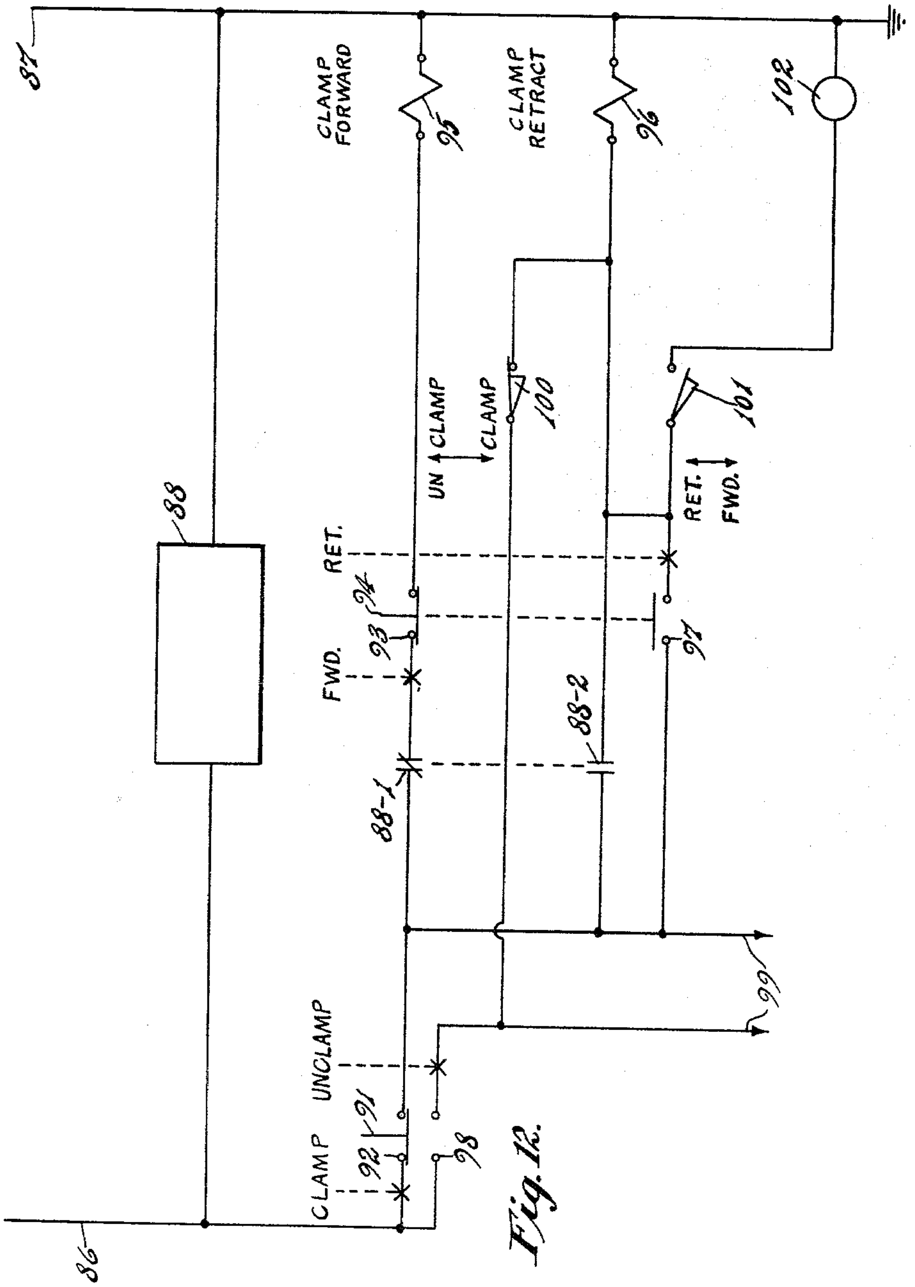
FIGURE 12 is an electric circuit diagram of the device of the invention.

In FIGURE 12, we show an electric circuit suitable to operate the device of the invention and including power leads 86 and 87, the latter suitably being grounded. The leads are desirably connected to a source of alternating current at 110 volts, 60 cycles. An approach responsive device 88 is connected across between the leads and located at the bottom of the housing 57 where it can respond to approach to a danger area indicated by interference pattern 90 (FIGURE 7) suitably placed beneath the machine. The interference pattern 90 corresponds to an area within which the workholders in an extended or advanced position would be, for instance, in the path of the turret of a turret punch or the cam of a punch press. The interference pattern 90 may suitably be of magnetically susceptible material (such as steel) which will cause response in the approach responsive device 88. If desired, however, the device 88 may be a limit switch instead of an approach responsive device. The approach responsive device 88 may be of any conventional sort.

The relay in the approach responsive device 88 has one set of normally closed contacts 88–1 and one set of normally open contacts 88–2.

The normally closed contacts 88–1 are in series with one set of contacts 92 of switch 91 and one set of contacts 93 of switch 94 and with the solenoid valve 95 which tends to throw the hydraulic valve into position to advance the thruster 51 forward and clamp the work.

Thus in normal automatic operation, the solenoid 95 is energized through contacts 92 of switch 91 and through contacts 93 of switch 94 and closed relay contacts 88–1 to move the thruster to its extreme forward position and clamp the work in the jaws.

Additional circuit units similar to those described can be connected at 99.

If the equipment (gauging table) moves to a position where the workholder is liable to be damaged by interference with a portion of the machine tool, such as the turret of a punch press, from further operation of the machine, the approach responsive device 88 comes into proximity with the pattern 90 and the relay in the approach responsive device 88 picks up, opening normally closed contacts 88–1 and closing normally open contacts 88–2. This area of interference is a danger area. Solenoid valve 96 is energized, throwing the hydraulic valve into the position to retract the thruster 51, open the jaws and retract the carriage. As long as the gauging table remains in the danger area, the approach responsive device remains energized and the particular workholder remains retracted, although other workholders not in the danger area are supporting the work and retaining it in the proper position.

When the gauging table moves away from the danger area, the approach responsive device is deenergized and the control relay returns to normal condition.

The hydraulic valve then is shifted by solenoid 95 to advance the workholder and grip the work.

Although one workholder may release and another take hold, this does not change the position of the work as the work is being held by other workholders.

Thus it will be evident that when one of several workholders approaches a dangerous area, it will automatically release and then, if the danger persists sufficiently long will retract. As soon as the danger clears, the reverse operation takes place automatically. Thus if the work moves from side to side of the machine through the turret punch press or the like, the successive workholders will release and then take hold again, but the work will always be held properly by the remaining workholders.

In manual operation, any workholder can be retracted independently of other workholders by operating switch 94 to open normally closed contacts 93 and close normally open contacts 97. This deenergizes solenoid valve 95 which urges the workholder forward and energizes solenoid valve 96 which opens and retracts the workholder.

When all workholders are to be clamped and unclamped in unison this is controlled by switch 91. If switch 91 is shifted to open contacts 92 and close contacts 98, the forward acting solenoid valve 95 will be deenergized and the rearward acting solenoid valve 96 will be energized through normally closed limit switch 100. At the point where the jaws are fully unclamped, limit switch 100 is opened by trip mechanism 81 and this deenergizes the retracting solenoid 96 on the workholder.

When it is desired to load the work in the workholder, switch 91 is manually shifted to open contacts 92 and to close contacts 98 to energize the retracting solenoid 96 on each workholder. The workholder jaws 35 and 36 are opened by the collar 43 which is being moved rearward by the thruster 51. This continues until the trip mechanism 81 engages roller 100′ on limit switch 100. Trip mechanism 81 is adjusted so that the jaws are fully unclamped when the switch 100 is activated, and this prevents the locking pin 74 from being withdrawn. Thus the workholders are in their fully extended position when the work is being clamped and unclamped for loading and unloading respectively.

Limit switch 101 is used in conjunction with relay 102 to indicate when the workholder is retracted from the danger area. When the workholder reaches the extreme retracted position limit switch 101 is closed and control relay 102 is energized. The relay 102 remains energized as long as the workholder is in the retracted position actuating limit switch 101. Relay 102 is thus capable of providing any required interlocks with the machine tool.

Figure 8:
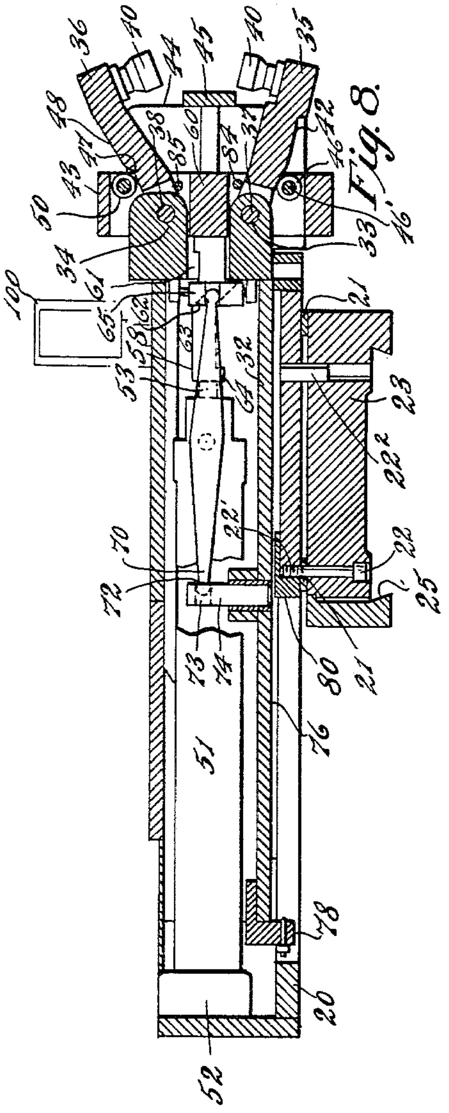
FIGURE 8 is a central vertical section of the workholder of the invention, the section being taken on the line 8—8 of FIGURE 5 to reduced scale.

Having now described the operation of the electrical device, the operation of the workholder mechanism is as follows:

Considering first the position of FIGURE 8, with the thruster fully retracted, the follower 65 is engaging cam track 61, and the toggle lever is in the position in which pin 74 is retracted and is locked in that position by engagement with track 76. The cam follower 65 is not permitted to ride up the cam slope 62 because of the locking by the toggle lever and pin 74, so that the cam collar 43 remains in retracted position even when the thruster is energized to move forward toward the position of FIGURE 9. The lower jaw 35 is open with its cam surface 41 resting against cam roller 46 and the upper jaw is open with its cam surface 47 resting against pin 85 on the cam collar and supported by pin 85.

As fluid is introduced behind the piston in the cylinder 51, the piston rod 53 pushes forward and the carriage 32 slides forward, while pin 74 slides on and is prevented from moving down by track 76 until the position of FIGURE 9 is reached, where pin 74 has passed beyond the front of the track 76. Up to this time the cam collar 43 has been locked against forward motion by the pin 74 and toggle lever 70 which are acting on cam follower 65 to hold cam 58 against moving forward in the carriage.

Figure 10:
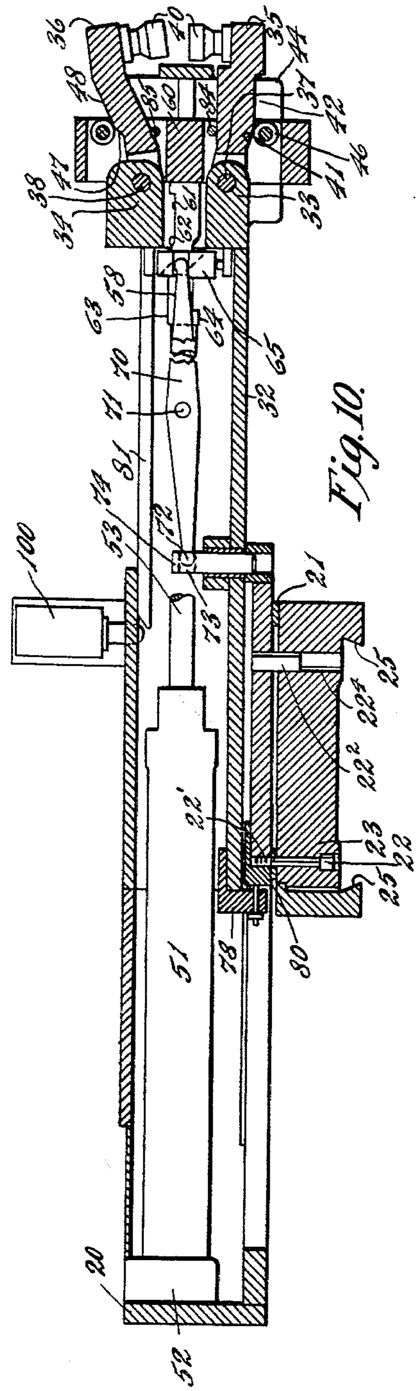
Figure 11:
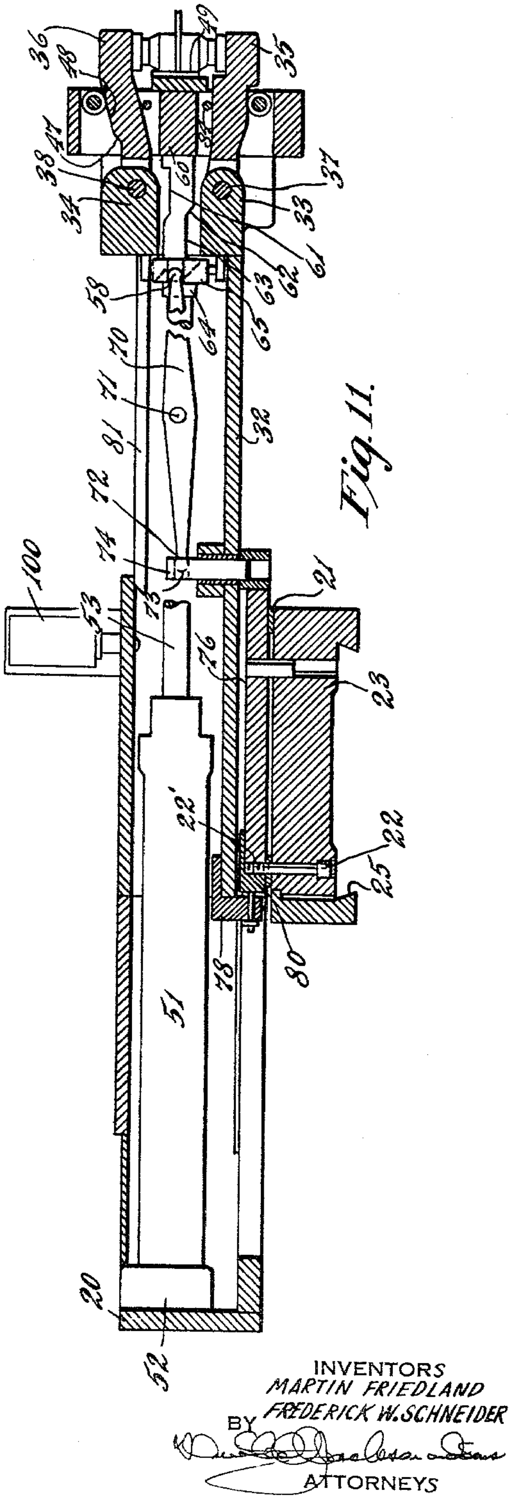

Now as shown in FIGURES 3 and 10, pin 74 moves to locking position and positively locks the carriage in forward position, while the lever 70 deflects the follower 65 upward as shown in FIGURE 10 and allows the cam 58 to move forward, the follower 65 engaging cam track 63. Cam collar 43 moves forward under the continued forward movement of piston rod 53 of the thruster 51 and lower cam rollers 46 raise the lower jaw to horizontal position by riding along cam surface 41 and then later as shown in FIGURE 11 hold the lower jaw horizontal by engaging cam surface 42. In the meantime, as the cam collar moves forward between the positions of FIGURES 10 and 11, under the action of the thruster, the upper cam rollers 50 on the cam collar act on the cam surface 48 on the upper jaw and the upper toggle pad grips the work at 102′. Forward motion of cam collar 43 is limited by cam surface 48, and in turn the jaw position of jaws 35 and 36 is determined by the work piece being clamped. It is evident that all thicknesses of work material within the capacity of the machine may be clamped without any adjustment.

The cycle is completed by a reversal of the sequence of FIGURES 8 to 11 as described above.

It will be understood that this complete cycle will take place only when the individual workholder is in danger of interfering with the operation being done on the work piece. To load and unload the work in the plurality of workholders, the carriages 32 are kept in a forward position while the jaws 35 and 36 are in the open position as previously explained.

The subject of the present invention is the improvement in the workholder comprising an automatically retracting and extending work locator as best seen in FIGURES 14 to 21.

Referring now to these figures, there is shown a work locator 110 connected by bolts, not shown, to a locator mounting 111. The locator mounting is generally of rectangular shape having diagonal slots 112 and a semicircular portion 113 removed from its perimeter. The mounting 111 has an integral extension 112′ located at the bottom thereof.

The locator mounting is slidably connected to the carriage 32 by socket head shoulder screws 114. The mounting is free to travel along the diagonal slots 112 in an upwardly forward and rearwardly downward direction. A spring retainer housing 115 is held as by bolts 116 to the carriage 32 and houses helical compression spring 117 carrying plunger 118. The plunger 118 bears against mounting 111 at 120. An actuator 121 is slidably mounted in actuator housing 122 fastened to the body with socket head bolts 123. The actuator has a longitudinal portion 124, a forward extension 125 and a rearward extension 126. An abutment 127 extends downwardly from the actuator longitudinal portion 124 at the rear of the actuator.

A dowel 128 is fixed in extension 126 and slidably engages the actuator housing 122. The dowel 128 serves as a guide for helical spring 130 which abuts against extension 126 of actuator 121 and against actuator housing 122 at 131.

A locator engagement lever 132 consists of an arm 133 extending rearwardly from a fixed pivot in the body 134 and has a forward arm 135 extending forwardly from the pivot 134. The lever 132 is suitably offset at the pivot as shown at 136. The forward portion 135 has a ball 137 which engages in opening 113 on locator mounting 111.

The lever 132 has an offset portion 140 on arm 133 having a tapered portion 141.

An adjustable stop 142 is located in the body at 143 and consists of bolt 144 adjustably held to the body by lock nut 145.

A rotary solenoid 146 is fixed to solenoid bracket 147 by bolts 148. The solenoid bracket is held to the body by socket head cap screws 150. Solenoid 146 has mounted on its shaft 151 an arm 152 having a curved portion 153 conforming to the diameter of dowel 154 fixed in the body at 155. The solenoid arm 152 rotates through an angle as shown in FIGURE 14 which suitably can be approximately 67 degrees.

Figures 14, 15:
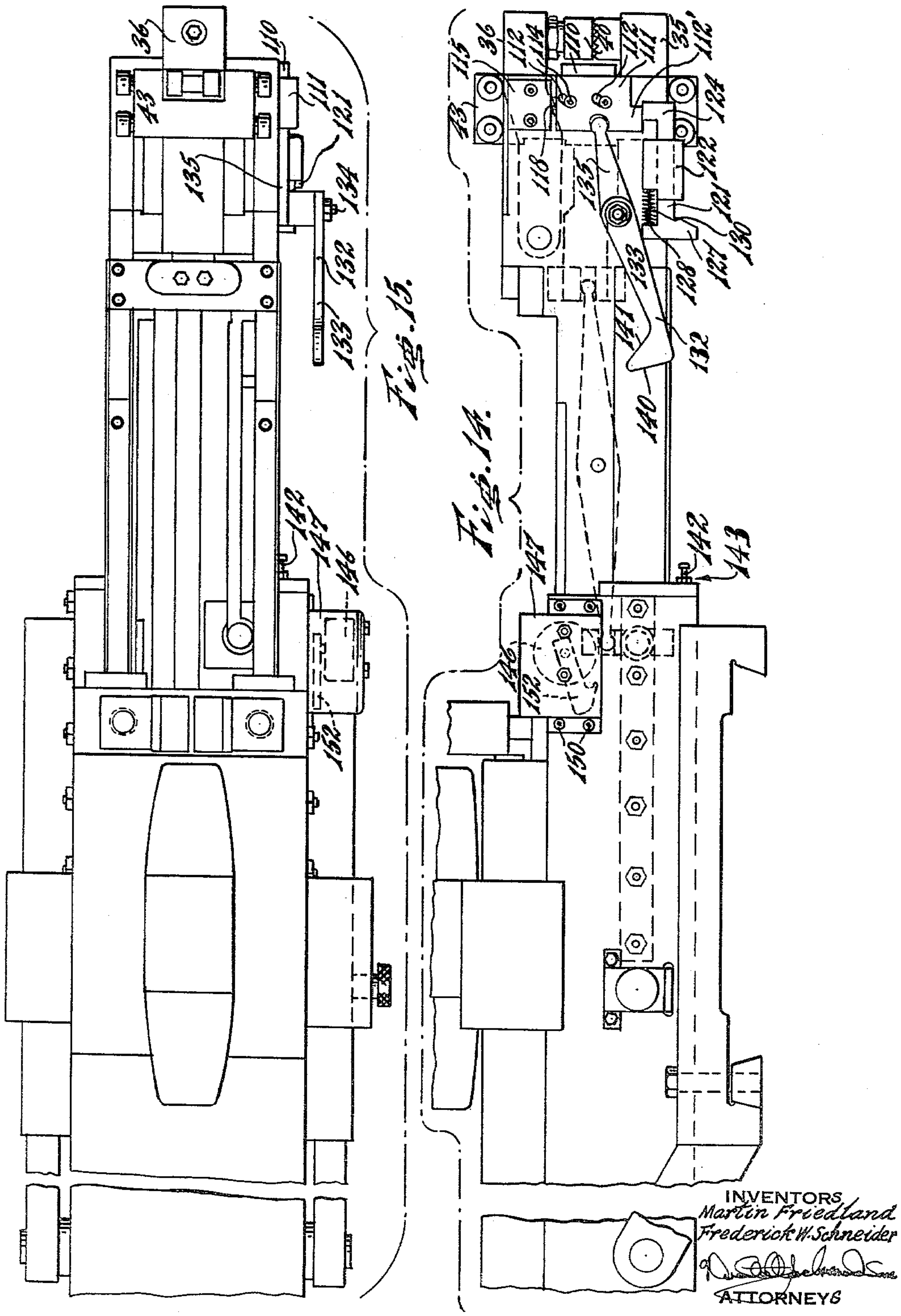
Figures 16, 17:
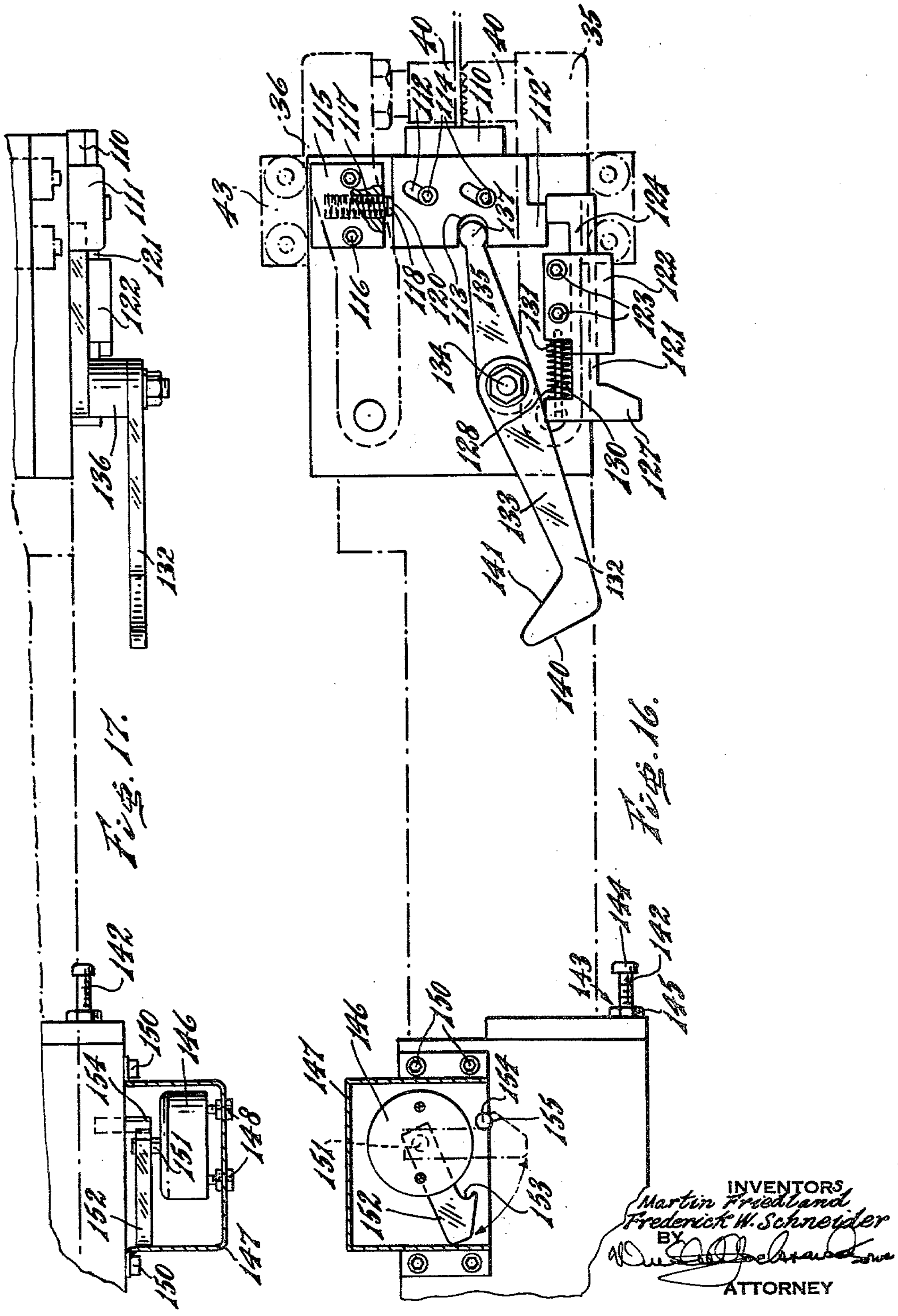

It should be understood that the forward reference position of the locator is at the position shown in solid lines in FIGURE 14 where the locator is at the forwardmost position with respect to the bolts 114.

Figures 18, 19:
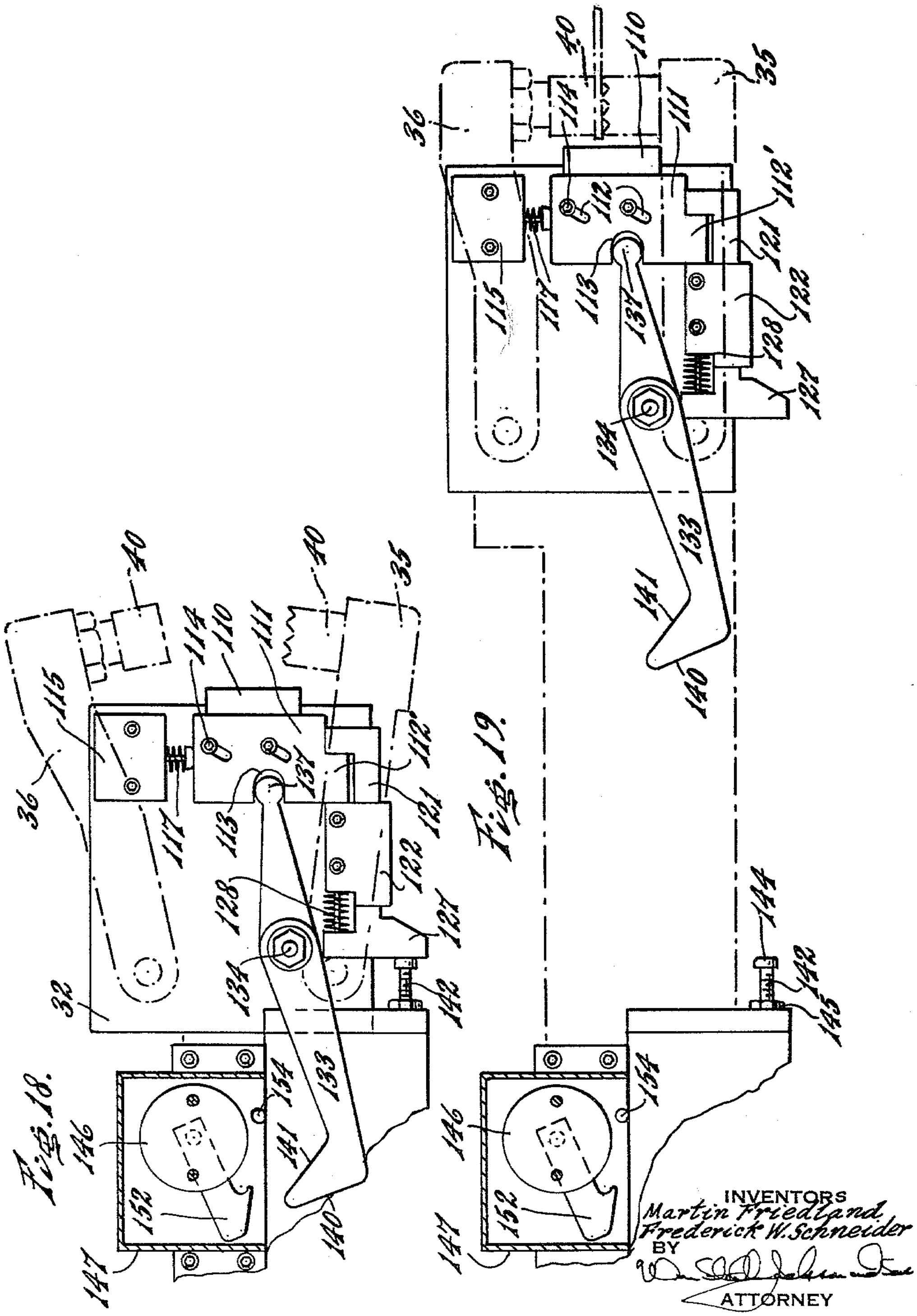

The locator is in a retracted position when the mounting is in its rearwardmost position with respect to the bolts 114 wherein the bolts are at the uppermost position in the slots, as shown in FIGURE 19. At this time locator 110 is being held in a rearward or retracted position relative to sides 44 at the forward end of carriage 32.

The locator assembly right after loading of a work piece is in the position shown in solid lines in FIGURE 14. The locator 10 is in a forwardmost or reference position and the jaws are clamped about the work piece. The locator 110 is held in its reference position by action of the actuator 121 wherein the actuator extension is under mounting extension 112′ and holds the mounting 111 in an upward position against the spring bias of helical spring 117 which is forcing the mounting downwardly. The actuator mounting 111 and actuator 121 are being held in a rearward position by virtue of spring 130 which acts around dowel 126 against abutment 128 on the actuator and against actuator housing 122. Lever 132 is in a counterclockwisemost position as viewed in FIGURE 16. Arm 152 of solenoid 146 is in a counterclockwise or upward position.

When one of the workholders comes into a danger zone the workholder retracts, as explained above, to a position shown in FIGURE 18. In this action, the jaws 35 and 36 open and the thruster 51 retracts the collar and the carriage 32. In the rearwardmost position of the carriage the extension 127 of actuator 121 strikes stop 142 as shown in FIGURE 18. This causes actuator 121 to be moved forward relative to carriage 32. The actuator extension 125 moves forward and slides with respect to mounting extension 112′, eventually clearing the extension, thus allowing mounting 111 to travel downwardly and rearwardly through slots 112 about screws 114. Locator 110 which is carried by mounting 111 is carried back out of the reference position in the workholder.

The solenoid arm 152 is in an upward or counterclockwise position as shown in FIGURE 18 and in this position the arm is clear of the lever 132.

After the danger zone has been cleared, the thruster moves the carriage forward for the jaws and workholder to again clasp the work, as shown in FIGURE 19. The locator 110 remains in a retracted position since the workpiece has already been fixed and is being held in its work position by other workholders. It is important for the locator to be held retracted when the workholder goes forward to resume its grip on the work because there is a tendency of the locator in its reference position to jar the work upon return to gripping position. Since the locator 110 has the primary function of locating the work only when loading, there is no need for the locator to be in reference position subsequent to the initial loading.

After the operations have been completed on the work piece and a new work piece is to be loaded into the workholders, the thruster is retracted and the carriage brought into a rearwardmost position as described above to the position shown in FIGURE 20. The operator closes a switch (not shown) from an electrical source energizing solenoid 146 causing arm 152 to rotate counterclockwise to a vertical position as shown in FIGURE 20 wherein the arm rests against dowel 155 at the curved portion 153.

Figure 20:
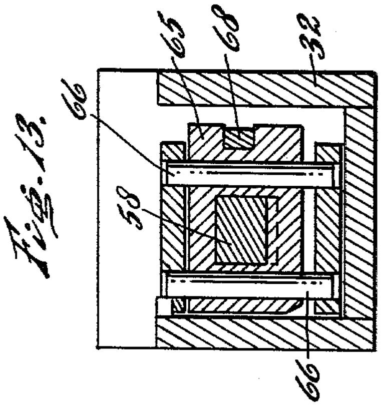
FIGURES 14 to 21 show a modified workholder with the improvement in the work locator function of the present invention.

The arm 152 in the position of FIGURE 20 acts as an abutment which depresses lever 132 at the extension 140 as the workholder moves forward. Bevel surface 141 of extension 140 comes into contact with the arm 152 and arm 133 rotates counterclockwise above pivot 134 causing arm 135 to rotate counterclockwise wherein ball 137 bears against the uppermost portion of opening 113 forcing mounting 111 upward against the helical spring 117. This causes the locator 110 to move into reference position which is in a forwardmost position relative to the carriage 32.

Figure 21:
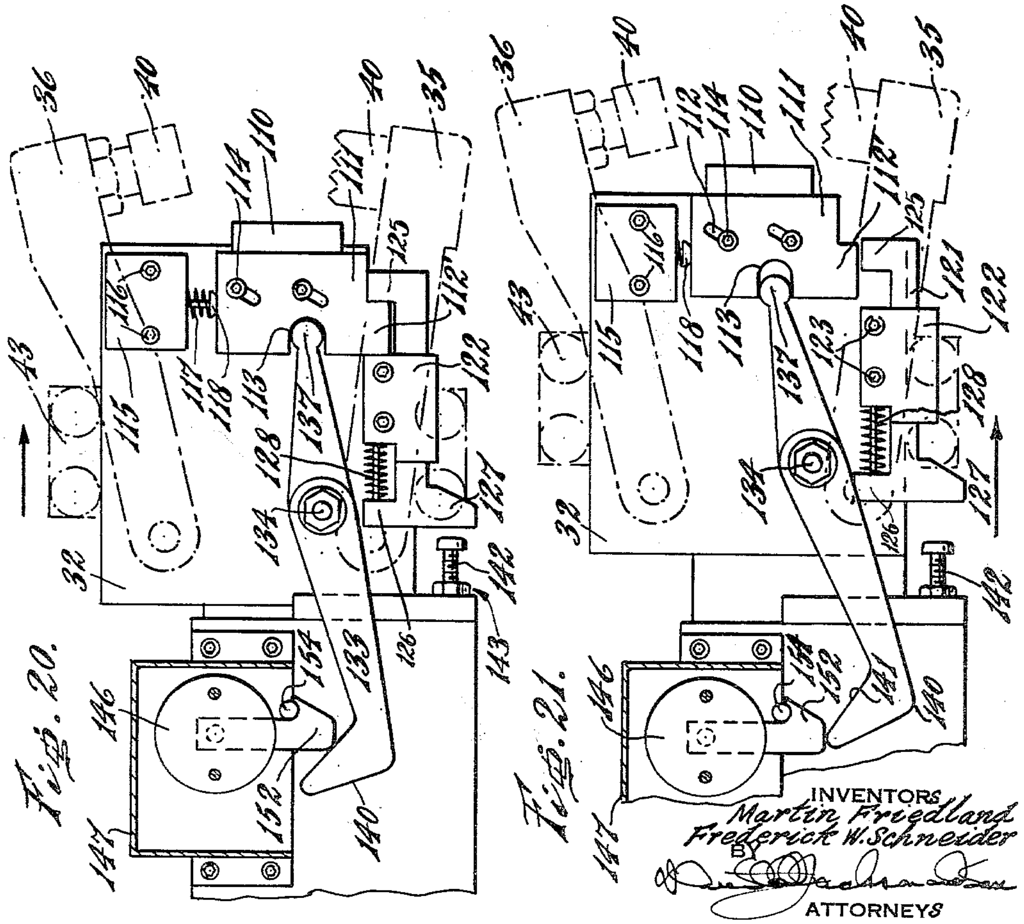

At the same time carriage 32 is moving forward under the action of the thruster, extension 127 of actuator 121 leaves the stop 142. Hence, actuator 121 is free to travel in a rearward direction relative to the carriage causing actuator extension 125 to slide into position underneath mounting extension 112, thus blocking mounting extension 111 in an uppermost position with locator 110 in its reference position. The workholder is now free to receive a new work piece with locator 110 in position to act as a reference surface for the work, as shown in FIGURE 21.

It should be understood that where the workholders are not retracted during the operation on the work piece, as, for instance, where the workholder does not come into a danger area, the locator would remain in reference position throughout the operation. On the other hand, it is possible that sometime during the operation all the workholders may retract, and under these conditions all the locators would be in a retracted position at the end of the operation on an individual work piece.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention, what we claim as new and desire to secure by Letters Patent is:

1. In a workholder for machine tools having a guide and a forwardly and rearwardly movable carriage extending from the guide, a work locator having a forward reference position and a retracted position with respect to the carriage slidably mounted on the carriage, an actuator slidably mounted on the carriage selectively supporting the locator in the forward reference position, a stop on the guide in abutting contact with the actuator when the carriage is retracted with respect to the guide which moves the actuator to release the locator for movement into a retracted position with respect to the carriage, locator engagement means mounted on the workholder selectively engaging the locator for movement of the locator into its forward reference position, and means to selectively actuate the locator engagements means.

2. A workholder of claim 1, wherein the locator slides diagonally on the carriage with respect to the direction of movement of the carriage from the guide, and the actuator slides on the carriage in a direction parallel to the direction of movement of the carriage from the guide.

3. A workholder of claim 2, wherein the locator and actuator are spring biased.

4. A workholder of claim 2, wherein the locator and actuator each include an extension in a direction toward each other and transverse to the direction of movement of the carriage with respect to the guide, the actuator extension supporting the locator extension when the locator is in a forward reference position, and the locator extension engaging the actuator extension when the locator is in a retracted position.

5. A workholder of claim 1, wherein the locator engagement means comprises a pivotally mounted lever in the carriage, and the means to actuate the locator engagement means comprises a solenoid actuated arm on the guide.

6. A workholder of claim 5, wherein the lever rotates to move the locator into its forward reference position, and said rotation results from the forward movement of the carriage with respect to the guide.

References Cited by the Examiner

UNITED STATES PATENTS

| | | | |
|---|---|---|---|
| 131,326 | 9/72 | Belcher | 269—234 X |
| 1,156,764 | 10/15 | Druck | 269—229 X |
| 1,822,501 | 9/31 | Onsrvd | 269—32 X |
| 3,027,155 | 3/62 | Paterson | 269—32 |

ROBERT C. RIORDON, *Primary Examiner.*

BROUGHTON G. DURHAM, *Examiner.*